Patented Nov. 3, 1953

2,658,078

UNITED STATES PATENT OFFICE 2,658,078

SOLVENT EXTRACTION OF OXYTETRACYCLINE

Edwin W. Blase, Carle Place, N. Y., assignor to Chas. Pfizer & Co., Inc., New York, N. Y., a corporation of Delaware No Drawing. Application September 19, 1950, Serial No. 185,695

9 Claims. (Cl. 260—559)

This invention relates to the purification of the antibiotic oxytetracycline. It has for an object the more efficient and economic recovery of this valuable chemotherapeutic from the crude or partially purified medium in which it is produced.

U. S. Patent 2,516,080, issued July 18, 1950, to Sobin et al., discloses the new compound oxytetracycline and its preparation. Several methods have since been described for the recovery and purification of this antimicrobial agent from fermentation broth of various organisms which elaborate it. Extracting the antibiotic in filtered oxytetracycline broth with solvents such as butanol is taught in the Sobin patent. A second procedure is described in an application filed on April 3, 1950, as Serial No. 153,760 by Regna et al., wherein precipitation of oxytetracycline as an insoluble compound with acidic dye salts is effected. In a third method disclosed in patent application Serial No. 165,588, filed on June 1, 1950, by Ensminger et al., the antibiotic is removed from its dilute solution as slightly soluble complex salts of certain polyvalent metal ions.

In the solvent extraction process taught in U. S. Patent 2,516,080, referred to above, the oxytetracycline broth obtained from a microorganism culture medium such as therein described is first clarified, the mycelium and any other insoluble contaminating matter being removed, specifically by simple filtration at a lowered pH. It has been found that when the pH is then raised to carry out the extraction, there is a tendency to form additional solid material which interferes with such extraction and necessitates a second separation. This solid material generally comprises complex salts of oxytetracycline with the polyvalent metallic ions naturally occurring in the nutrient media wherein the oxytetracycline-producing microorganism was grown. Following the second separation, the basic solution is finally extracted with a solvent such as butanol, amyl alcohol or phenylcellosolve. After separation of the resulting solvent and residual broth phases, the solvent layer is reextracted with dilute acid, and the separated aqueous phase is made neutral or slightly basic to precipitate an amorphous oxytetracycline product. By procedures involving several additional steps, crystalline oxytetracycline may be obtained from this product.

It has now been found that recovery of oxytetracycline by a solvent-extraction process may be greatly improved and simplified by adding to a clarified, acidic oxytetracycline-containing fermentation broth, obtained from the growth of various microorganisms in the usual nutrient media, at least one sequestering agent for polyvalent metallic ions, and thereafter extracting the oxytetracycline from such broth. The purity of the extracted product and the ease of extraction are considerably enhanced by this process. There is substantially no tendency for undesired precipitates to form when the filtered fermentation broth is later made basic before extraction, as is the case when no addition of a sequestering agent is made. The function of the sequestering agent is apparently to bind the multivalent metallic ions which normally occur in fermentation broth, hence to suppress the precipitation of complex metal salts of oxytetracycline as the filtered solution is made basic. This binding action seems also to minimize the extraction of oxytetracycline in the form of complex metallic compounds. A further effect is to decrease emulsification during extraction greatly assisting rapid, large-scale operation.

The term "sequestering agent" is used in the chemical field to define a group of compounds such as described in the Journal of Chemical Education, volume 25, page 482, 1948. Many of these agents are weakly ionized, polybasic acid compounds or hydroxylated, organic, carboxylic acids. Among the useful substances may be mentioned, for instance, citric acid, gluconic acid, water-soluble polyphosphate salts (e. g. sodium tetraphosphate), certain amino acids such as ethylenediamine tetraacetic acid or ethylenediamine triacetic acid, mixtures of such compounds, and any agent which will serve to sequester and bind metallic ions such as calcium, magnesium, iron, etc., present in the usual microorganism fermentation broths. Many others of this class are commercially available and their value in the instant invention will be obvious to those skilled in the art.

The value of two of the agents listed above may be observed by comparing the distribution coefficients of the antibiotic when these agents are added to acidified, filtered broth. The determination was carried out with portions of the same batch of oxytetracycline to which 0.5% of the compounds were added before adjusting to pH 10. One-third volume of butanol was used and the single extractions were made in separatory funnels. The separated layers were assayed for oxytetracycline content by a standard method and the distribution coefficients (the ratio of the concentration of oxytetracycline in the solvent phase to that in the aqueous phase) were calculated.

| Reagent | Distribution Coefficient | Effect of Adjustment to pH 10 |
|---|---|---|
| None | 11.5 | Heavy ppt. |
| Citric Acid | 26.5 | None. |
| Glucono-delta-lactone | 18.5 | Slight ppt. |

(Glucono-delta-lactone is a convenient source of gluconic acid in a dry, easily handled form.)

According to one specific embodiment of this new process, the sequestering agent is added to filtered fermentation broth; the pH is then made basic and the oxytetracycline antibiotic is extracted with a solvent such as a broth- (or a water-) immiscible alcohol. Solvents which are generally preferred include normal butanol, secondary butanol, amyl alcohols, cyclohexanol, phenylcellosolve, mixtures of these, but any solvent which will preferentially extract the oxytetracycline from the particular broth or medium in which it is found can be used. The extraction is effective when performed under relatively alkaline conditions, and preferably within a pH range of about 8.5 to about 11.5, while a pH of about 10.0 is often most practical. Although broths of lower potency may readily be used, one having at least 800 micrograms per milliliter (mcg./ml.) oxytetracycline activity is frequently preferred, in order that the most favorable results may be obtained. The extracting solvent may be employed in conventional batch, continuous counter-current, or any other suitable type of extraction procedures. The total volume of solvent can vary widely but is perhaps best at from about $\frac{1}{10}$ to about $\frac{1}{2}$ the volume of broth or other crude oxytetracycline-containing medium. Batch-type operations may be conducted in suitable vessels equipped for proper agitation, while continuous extraction may be made in the well-known Podbielniak extractor or in a packed tower or in essentially any apparatus generally used in the art for such a process.

After separation of the solvent phase containing the oxytetracycline from the waste broth or aqueous phase, the solvent extract is acidified. For this purpose, hydrochloric, sulfuric or phosphoric acids, etc., or a strong organic acid or the like may be used. In order readily to separate the oxytetracycline from the solvent at this point, the potency of the extract should be at least about 1500 mcg. of oxytetracycline per milliliter, and it is even better to use extracts having a potency of about 4000 mcg./ml. or more. Surprisingly, it has been found that the degree of acidification contributes largely to the character of the oxytetracycline product finally recovered. Crystalline amphoteric oxytetracycline separates from such extracts when the pH is adjusted to about 5.0 or lower. If the pH is adjusted below about 3.0, the product tends to dissolve, however. A crystalline material may not be obtained if the solvent is completely anhydrous, but in practice the generally useful solvents usually contain some dissolved water after separation from the exhausted aqueous phase. On the other hand, oxytetracycline separates from the solvent extract at a pH higher than 5.0 and up to about 7.5 as an amorphous substance. The potency of both products is about the same. If desired, the extract may first be concentrated, preferably under vacuum, and amphoteric oxytetracycline may thereafter be separated from the concentrate by adjusting the pH.

It is possible directly to prepare at this point a crystalline acid salt of the antibiotic, such as crystalline oxytetracycline hydrochloride. The crystalline or amorphous oxytetracycline product may be dissolved in methanol or the like with the addition of anhydrous calcium chloride. Decolorizing carbon may be added to remove various impurities, and the mixture is then filtered. Upon addition of concentrated hydrochloric acid to the clarified filtrate, highly pure, crystalline oxytetracycline hydrochloride precipitates.

When the unconcentrated solvent extract is used for the preparation of free oxytetracycline, the antibiotic product, after drying, generally has a potency of about 500 to about 700 micrograms per milligram (mcg./mg.). The quality varies somewhat with the acid used for adjusting the pH. When sulfuric acid is used, the ash content of the product is somewhat higher than is the case when hydrochloric acid is used, but the latter acid tends to lower the yield slightly. Before adding the acid the solvent extract may be purified by the use of decolorizing agents such as activated carbons. This results in a product of higher potency, but there is some loss in yield.

In adjusting the pH of the extract, strong aqueous solutions of acids are generally preferred; for instance, phosphoric acid at a concentration of 75 to 85 per cent is quite suitable. The acidification may be carried out by simultaneously running the solvent stream and a stream of the acid into a suitable vessel having adequate agitation means. By adjusting the rates of these two streams the chosen pH may thus be maintained constantly. Rather than acidifying in this continuous manner, the acid may be added slowly to the entire volume of extract. The pH is adjusted with the use of a glass electrode pH meter, and all figures for pH given in this specification and claims have been read directly in this manner, with the solvent phase undiluted by added water.

The final crystalline or amorphous, amphoteric oxytetracycline precipitate may be separated from the organic solvent by any desired means such as conventional filtration. If it is desired to use this purified oxytetracycline directly in therapy, a filteraid is best omitted; otherwise, it may be helpful to accelerate the separation. In either case the product may be washed with a substance like butanol and dried at an elevated temperature, preferably lower than 55° C. however, at either atmospheric pressure or under vacuum. If the product is to be converted to crystalline oxytetracycline hydrochloride or a similar salt, this drying step may be omitted. For such conversion the butanol-wet product can be used or it may be washed with methanol containing some water, to displace the butanol. That product can then be converted to the crystalline hydrochloride as hereinbefore described.

In an alternative process for the recovery of oxytetracycline from the organic solvent extract, the solvent solution of antibiotic may be extracted with dilute acid. The separated acid phase may then be separated and neutralized to precipitate oxytetracycline. The precipitated product may be converted to a crystalline product by methods described in U. S. 2,516,080, or by other similar methods.

The various mother liquors formed in these processes may be recycled, thus further improving the overall yield of purified oxytetracycline antibiotic obtained from a given oxytetracycline broth. For instance, the residual solvent left when the oxytetracycline has been precipitated by acidification and separated, usually has a water phase of up to 1% by volume. This water phase generally contains from 20,000 to about 65,000 micrograms of antibiotic per milliliter. By allowing it to settle or by centrifuging it, an appreciable amount of oxytetracycline may be recovered and added to the next batch of oxytetracycline broth. The residual solvent itself generally contains from about 1,000 to about 1,500 micrograms of antibiotic per milliliter. A large portion of this may be most easily recovered by extracting the solvent either batchwise or by a counter-current method with a dilute aqueous acid solution at a pH of about 2.0. A solvent ratio is here used which reduces the solvent potency to less than 100 mcg./ml. The aqueous extract recovered from such operation is then recycled to mix with new filtered oxytetracycline broth, and the solvent is recovered by distillation.

In carrying out the process of the present invention, it has been found generally satisfactory and most economically feasible to employ between about 1.6 and about 16 lbs. of the particular sequestering agent per 100 gallons of the initial aqueous phase such as the broth. In the case of many of these agents, a proportion nearer the lower end of this range is often sufficient, e. g. only about 4 lbs. of citric acid per 100 gallons is a particularly useful and economical quantity of that compound. A higher amount of the agent will tend to improve the distribution coefficient during the extraction of the basic oxytetracycline broth, but may not be otherwise too practical. A lower proportion of agent is generally not sufficient to prevent the undesirable formation of a precipitate when the filtered oxytetracycline broth is made basic. In addition, when the ratio of the sequestering agent is more drastically lowered, more polyvalent metallic ions will generally contaminate the oxytetracycline product. The yield of the amphoteric oxytetracycline obtained when the solvent extract is acidified depends on the potency of the original broth, the solvent ratio utilized, and the proportion of sequestering agent added. The metals with which the sequestering agents combine appear to include calcium, magnesium, aluminum, iron, zinc and so forth, all or some of which occur in the various conventional oxytetracycline fermentation broths.

The process of the instant invention represents many improvements over previous methods for oxytetracycline recovery and purification. The addition of a sequestering agent to the oxytetracycline broth unexpectedly improves the distribution coefficient in the extracting solvent by amounts up to 50% or more. The amount of colored impurities extracted with the oxytetracycline is also reduced, and there is a marked lowering of the proportion of polyvalent metals which are extracted as complex salts with the antibiotic. These improvements in the extraction make possible increased yields, and the recovery of amphoteric oxytetracycline of increased purity. Furthermore, a simple control of the acidity of the solvent extract may be used to make an oxytetracycline product that is crystalline or amorphous; thus the number of steps heretofore required for the preparation of the crystalline antibiotic or its crystalline salts is very greatly reduced.

The following examples are given by way of illustration and are not to be considered as the only embodiments of this invention. Indeed, as many widely different embodiments hereof may be made without departing from its spirit and scope, the invention should be understood to be unlimited except as defined in the appended claims.

Example I

A strain of *Streptomyces rimosus* was grown as described in U. S. Patent 2,516,080, using a neutralized culture medium of tap water containing 5 grams per liter of calcium carbonate and a mixture of 30 parts by weight of soybean meal, 5 parts of corn starch, 3 of sodium nitrate and 1 of an enzymatic digest of casein. The resulting oxytetracycline containing fermentation broth, after reaching the desired oxytetracycline strength, was adjusted to pH 2.5 with sulfuric acid. A standard filteraid of diatomaceous earth was added and the mycelium was removed by filtration. Five hundred gallons of the acidified filtered broth, which assayed 550 mcg./ml. in oxytetracycline potency, were mixed with twenty gallons of a dilute aqueous phase acid extract of residual butanol solvent recovered from a previous oxytetracycline-extraction operation. These twenty gallons of acid extract contained 190 million micrograms of oxytetracycline. To the combined aqueous solutions were added thirty gallons of butanol to saturate the mixture, thus preventing volume changes during the extraction, and minimizing emulsification during the prospective counter-current operation. Twenty pounds of citric acid were then introduced as the chosen sequestering agent, and the solution was adjusted to pH 10.1 with 15.8 liters of 40% sodium hydroxide solution in water. The volume of the solution then totalled 560 gallons and the antibiotic potency was 625 mcg./ml. This alkaline broth was extracted in a Podbielniak continuous counter-current extractor using water-saturated butanol as the extracting solvent. After separation of the two resulting organic and aqueous phases, there were obtained 144 gallons of a butanol extract and 568 gallons of exhausted oxytetracycline broth. The latter contained only 65 micrograms of antibiotic per milliliter and was discarded. The butanol contained 2,630 micrograms of antibiotic per milliliter, and this extract was adjusted to a pH of about 5.3 with a 75 per cent solution of phosphoric acid in water by weight. After agitating for one hour, the material was filtered with a standard filteraid, washed with butanol and dried at 50° C. The small aqueous phase which separated from the butanol filtrate was retained to be recycled to a later batch of filtered oxytetracycline broth. The butanol phase, which now had a volume of 150 gallons and contained 1,020 micrograms of antibiotic per milliliter, was extracted with dilute phosphoric acid at a pH of 2.0, and this extract was also retained for a later batch. The dried amphoteric oxytetracycline product weighed 2,919 grams. It assayed only 103 mcg./mg. due to the large proportion of filteraid still present. A portion of this dried material weighing 200 grams was suspended in 500 milliliters of methanol and 100 milliters of calcium chloride-saturated methanol were added to the suspension. Twenty-five grams of decolorizing carbon were stirred therewith for one-half hour, the mass was then filtered, and the filter cake was washed five times with a total of 100 milliliters of methanol. The filtrate was finally treated with 50 milliliters of concentrated hydrochloric acid, the addition being made slowly and with constant stirring. After stirring the mas for one hour, the crystalline oxytetracycline hydrochloride which had precipitated was filtered and washed with methanol. The dried product weighed 10.1 grams and was particularly suitable for therapeutic use.

*Example II*

Eight hundred gallons of oxytetracycline broth from the same source as that in Example I were acidified with concentrated sulfuric acid until a pH of 2.4 was reached. Two hundred and forty pounds of a filteraid were added, the mixture was filtered and the filter cake was washed several times with small volumes of water. The filtrate had a volume of 850 gallons and assayed 790 mcg./ml. in oxytetracycline potency. It was mixed with 32.5 gallons of aqueous waste mother liquors recovered from a previous oxytetracycline-extraction process, which liquors contained 310 million micrograms of the antibiotic. The mixture thus had a total activity of 3,210 million micrograms. To it were added 49 gallons of butanol and 32.5 pounds of citric acid. The solution was adjusted to a pH of 10.1 with 24 liters of 40% caustic soda solution in water, and was then extracted counter-currently with butanol in a Podbielniak apparatus using a ratio of 4.7 volumes of broth to one volume of water-saturated butanol. The resulting butanol extract, with a volume of 200 gallons, assayed 3,880 mcg./ml., a total of 2,940 million micrograms of oxytetracycline. The aqueous raffinate, with a volume of 944 gallons, assayed 65 mcg./ml., a total of only 230 million micrograms of oxytetracycline, and was discarded. To the butanol extract were added 1.2 liters of 75 per cent phosphoric acid solution in water by weight. The addition was made slowly with stirring and agitation was continued intermittently for six hours. The pH, read with a glass electrode directly on the butanol, was 4.0. The amphoteric oxytetracycline which had precipitated was filtered with the help of some more filteraid and dried at 50° C. The butanol filtrate had a volume of 229 gallons and assayed 1,180 mcg./ml., while the small aqueous phase which separated therefrom had a volume of 5 gallons and contained 11,330 mcg./ml. of antibiotic. The dried oxytetracycline product weighed 2,618 grams and assayed 233 mcg./mg. A portion of this product (200 grams) was suspended in 500 milliliters of methanol and 100 milliliters of calcium chloride-saturated, anhydrous methanol were added to the suspension. Five grams of standard decolorizing carbon were mixed with the suspension and stirred therein for one hour. After filtering and washing the filter cake with methanol, 50 milliliters of concentrated hydrochloride acid were added to the filtrate. This latter was then stirred for one hour and the crystalline oxytetracycline hydrochloride which separated was removed by filtration, washed on the filter with methanol, and dried at 50° C. The crystals were found to weigh 33.25 grams and to have a potency of 890 mcg./mg. The methanol mother liquor and wash had a volume of 1,025 milliliters and assayed 13,080 mcg./ml. This material was recovered, but could not advantageously be added to new filtered oxytetracycline broth for a subsequent extraction because of its high proportion of calcium.

What is claimed is:

1. In a process for the solvent-extraction of oxytetracycline from a clarified, acidic, oxytetracycline-containing fermentation broth, the improvement which comprises adding to the clarified broth before the extraction at least one sequestering agent for polyvalent metallic ions.

2. A process which comprises filtering at an acid pH and oxytetracycline-containing fermentation broth, adding to the filtrate at least one sequestering agent for polyvalent metallic ions, alkalizing the filtrate, and extracting oxytetracycline therefrom with a broth-immiscible solvent.

3. A process which comprises clarifying an acidic oxytetracycline-containing fermentation broth, adding to the clarified solution at least one sequestering agent consisting of a weakly ionized, polybasic acid compound, and extracting the oxytetracycline.

4. A process which comprises clarifying an acidic oxytetracycline-containing fermentation broth, adding to the clarified solution at least one sequestering agent consisting of an hydroxylated, organic carboxylic acid, and extracting the oxytetracycline.

5. A process which comprises clarifying an acidic oxytetracycline-containing fermentation broth, adding citric acid to the clarified solution, and extracting the oxytetracycline.

6. A process which comprises clarifying an acidic oxytetracycline-containing fermentation broth, adding gluconic acid to the clarified solution, and extracting the oxytetracycline.

7. A process which comprises clarifying an acidic oxytetracycline-containing fermentation broth, adding sodium tetra-phosphate to the clarified solution, and extracting the oxytetracycline.

8. A process which comprises filtering at an acid pH an oxytetracycline-containing microorganism fermentation broth, adding to the filtrate from about 1.6 to about 16 pounds of a sequestering agent for polyvalent metallic ions per 100 gallons of fermentation broth, alkalizing the filtrate to a pH of substantially between 8.5 and 11.5, extracting the oxytetracycline by preferential solution in a broth-immiscible alcohol, acidifying the extract to a pH range of approximately 5.0 to 7.5, and recovering the amorphous oxytetracycline product thereby precipitated.

9. A process which comprises filtering at an acid pH an oxytetracycline-containing microorganism fermentation broth, adding to the filtrate from about 1.6 to about 16 pounds of a sequestering agent for polyvalent metallic ions per 100 gallons of fermentation broth, alkalizing the filtrate to a pH of substantially between 8.5 and 11.5, extracting the oxytetracycline by preferential solution in a broth-immiscible alcohol, acidifying the extract to a pH range of approximately 3.0 to 5.0, and recovering the crystalline oxytetracycline product thereby precipitated.

EDWIN W. BLASE.

References Cited in the file of this patent

UNITED STATES PATENTS

| Number | Name | Date |
| --- | --- | --- |
| 2,461,922 | Rake | Feb. 15, 1949 |
| 2,516,080 | Sobin | July 18, 1950 |

OTHER REFERENCES

Florey, "Antibiotics," vol. II (1949), p. 1303.